United States Patent

Cremer et al.

[15] 3,668,683

[45] June 6, 1972

[54] PERIODIC TIMED SWITCHING APPARATUS

[72] Inventors: John W. Cremer, Elm Grove; Norman A. Krohne, West Allis, both of Wis.

[73] Assignee: Cremer Engineering Company, Inc., Milwaukee, Wis.

[22] Filed: Oct. 29, 1969

[21] Appl. No.: 872,097

[52] U.S. Cl. ..............................340/309.4, 179/37, 200/18
[51] Int. Cl. ..............................G08b 1/08
[58] Field of Search ..............................340/309.4, 309.1, 333; 58/34; 179/37; 200/18

[56] References Cited

UNITED STATES PATENTS

| | | | |
|---|---|---|---|
| 3,430,222 | 2/1969 | Gratrix, Sr. et al. | 340/309.4 X |
| 3,496,315 | 2/1970 | Giese, Jr. et al. | 200/18 |
| 3,456,123 | 7/1969 | Pihl | 340/309.4 |
| 3,475,747 | 10/1969 | Kratomi | 340/309.4 |

FOREIGN PATENTS OR APPLICATIONS

| | | | |
|---|---|---|---|
| 564,586 | 1/1924 | France | 340/309.4 |

*Primary Examiner*—John W. Caldwell
*Assistant Examiner*—William M. Wannisky
*Attorney*—Andrus, Sceales, Starke & Sawall

[57] ABSTRACT

This disclosure relates to a motel call system for waking the room occupants at a requested time. Each room is connected to the central station by a single cable having one common return line and a signal line for each time. A rotary selector switch selectively connects a bell to one of the cable signal lines. The central station includes a rotary stepper relay switch selectively connecting the signal line to a power supply via a double pole, double throw control relay which is energized periodically via timed contacts. The control relay supplies power to the stepper relay and to a timing capacitor in one position. In the alternate position, the relay short circuits the stepping relay contacts and the room stations, and connects the capacitor to energize the stepping relay to move to the next time position. When the stepper relay has scanned all of its operating times, a reset contact is connected to energize the reset coil to reset the stepper relay.

9 Claims, 2 Drawing Figures

Figure 1:
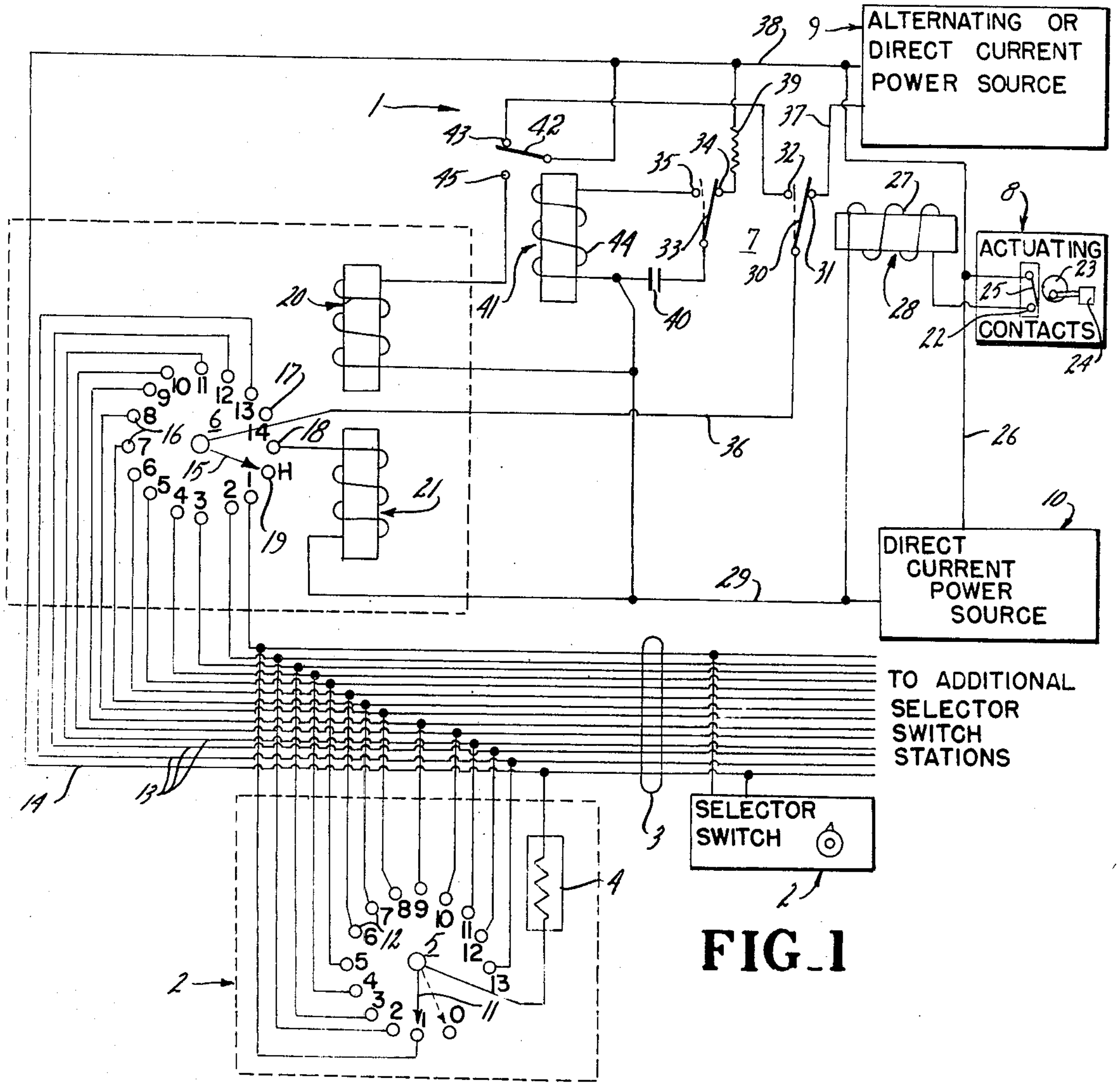

INVENTORS
JOHN W. CREMER
NORMAN A. KROHNE
BY
Andrus, Sceales, Starke & Sawall
Attorneys

PERIODIC TIMED SWITCHING APPARATUS

This invention relates to a periodic, timed switching apparatus and particularly to such apparatus for establishing a series of circuits in a pre-determined sequence and for a predetermined duration or time period.

A plurality of dispersed electrical devices are often connected into an interrelated circuit wherein the several devices are to be actuated in a predetermined, timed sequence. Thus, instrumentation systems often require periodic operation of a plurality of remote instruments, loads or the like. A further example in which a number of remotely located devices are to be actuated is the usual hotel or motel wake-up alarm system which is generally manually operated under present day procedures. Thus, each room occupant will telephone the operator and request to be called at a given time. The following morning each room is separately called by the telephone operator. Although automatic systems have been proposed, they have not generally been found acceptable in the industry.

The present invention is particularly directed to a reliable and relatively inexpensive periodic, timed switching apparatus which can be employed in the provision of a practical remote wake-up signaling system as well as any other application requiring the periodic and timed switching of electrical devices or the like.

Generally, in accordance with the present invention, the switching apparatus includes a timed input signal interconnected to a timing and reset control switch means which is interconnected to drive or control a sequencing switch means. The control switch means includes means to effectively disconnect the sequencing means during the resetting and during a standby condition of the switching circuit. The control switch means further includes a first position in which power is supplied to the sequencing switch means, and an alternate position in which power is supplied to a forward drive means. The latter forward drive means is interconnected to the sequencing switch means to open the disconnect circuit and to drive the sequencing switch means forward in a predetermined manner in response to the energization and subsequent de-energization of the control switch means.

In particular, in a highly satisfactory system applied to a motel call alarm system, each of the rooms were interconnected to a central station through a single cable having one common return line and a plurality of signal lines related one to each of the 15 minute intervals between 5:00 and 8:30. This time period covers essentially 90 per cent of all of the wake-up times desired. At each room, a multiple input selector switch was provided having related contacts interconnected to the cable signal lines and the load interconnected between the selector switch and the common line. The central station included a single related sequencing rotary stepper relay switch having contacts interconnected to corresponding signal line contacts and a common input selectively interconnected to a power supply via the control switch means. The rotary stepper relay switch assembly included a stepping coil and a reset coil for sequentially moving of the common contact arm. A double pole, double throw relay was connected to selectively supply power to the stepper relay switch and was interconnected to a separate direct current power supply via a set of clock timed contacts. The relay had a first position in which a short circuit was established between the common contact of the sequencing stepper relay switch assembly and the common return line. This positively prevented transmission of signals across the system during the period that the relay was de-energized. In the alternate position, power was applied directly to the common contact arm. Additionally, power was applied to a timing capacitor which in turn was connected in the alternate position of the relay to actuate a stepping relay. Thus, during the period of the clock controlled energization of the double pole, double throw relay, power was applied to the sequencing switch relay common arm and to the timing circuit or the reset circuit. When the relay was de-energized, it reverted to the initial position and provided a short circuit across the stepping relay switch assembly contacts and energized the stepping relay which in turn supplied energy to the stepping coil. Thus, by the timed operation of the input contacts, a timed sequential energization of the several contacts of the stepper relay switch assembly was established. When the stepper switch assembly has scanned all of its operating contacts, it moved into engagement with a reset contact. A reset coil was interconnected through the reset contact to the control power supply in series with the sequencing switch and the by-passing circuit established across the sequencing switch.

Applicant has found that this circuit provides a highly reliable and inexpensive periodic timed switching apparatus.

The drawing furnished herewith illustrates the best mode presently contemplated by the inventor for carrying out the invention and clearly discloses the above advantages and features as well as others which will be understood from the following description.

Figure 2:
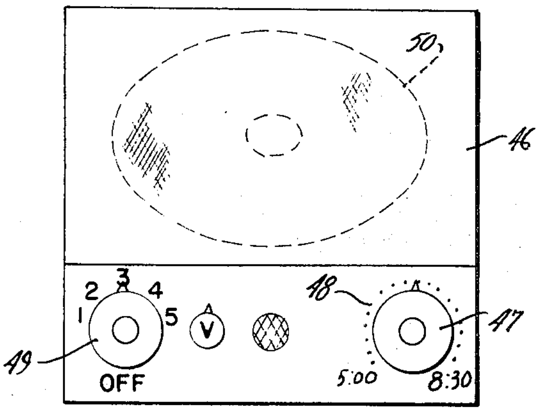

In the drawing:

FIG. 1 is a schematic circuit diagram of a wake-up alarm system or the like constructed in accordance with the present invention; and FIG. 2 is a diagrammatic illustration of a remote station shown schematically in FIG. 1.

Referring to the drawing and particularly to FIG. 1, the illustrated embodiment of the invention is a wake-up alarm system suitable for use in hotels, motels and the like. Generally, the illustrated embodiment of the invention includes a main or central control station 1 interconnected to a plurality of remote room stations 2 by a single coupling cable 3. Each of the remote room stations 2 include an output device or load 4 such as a bell, lamp or other signaling means. A selector switch 5 is provided for selectively interconnecting of the output device 4 to the coupling cable 3 which in turn is interconnected to a sequencing switch 6 for controlled energization of the selected device 4. The sequencing 6 switch forms a part of the central control station 1. A timing and reset control switch unit 7 is actuated by a periodic timed input unit 8 to selectively interconnect the sequencing unit 6 to a load operating power supply 9 and to a control power supply 10. The control switch unit 7 is interconnected to control power supply 10 for operation in response to the actuation of the input unit 8.

The load operating power supply 9 may be either an alternating current or a direct current power in accordance with the selection of the output device 4. The control power supply 10 is a low voltage direct current power supply in accordance with usual control practice. In practical construction, of course, the incoming power may be the conventional alternating current power distribution system employed in the United States with suitable converters employed to provide the dual supply of the desired alternating current or direct current power to the various circuits as hereinafter described.

Generally, in the operation of the system, the input unit 8 is actuated in pre-determined timed sequence to energize the timing and reset control switch unit 7. Each time it is actuated it applies power to the sequencing switch 6 for the corresponding actuated period, and also re-establishes a reset or step circuit. When the input unit 8 removes power from the control switch unit 7, power is removed from the sequencing switch 6 and applied to drive the sequencing switch 6 to the next position. This provides the desired scanning of the lines 13 of the single coupling cable 3 and in turn sequentially applies power to the several contacts of the selector switches 5 at the remote room stations 2. Therefore, the occupant can select the particular time at which he will actuate his related output device 4 by correspondingly setting of the selector switch 5.

More particularly, in the illustrated embodiment of the invention, the selector switch unit 5 is a rotary type switch having common contact arm 11 which is selectively movable into engagement with any one of a plurality of timed selection contacts 12. In the illustrated embodiment of the invention 13 time selection contacts 12 are illustrated to correspond to the 15 minute periods existing between 5:00 and 8:30 A.M. Each of the contacts is interconnected to a related time line 13 of cable 3. The load or output device 4 is connected between the common contact arm 11 and the common or ground return line 14 of the cable 13 for connection to the power supply 9 via the switch 6.

The sequencing switch 6 is shown as a rotary type stepper relay switch assembly having a common contact arm 15 selectively engaging a plurality of time contacts 16 which are connected to the various time lines 13 of cable 3. The illustrated sequencing switch 6 includes one or more extra blank contacts 17, a reset contact 18 and a dead standby or home contact 19 disposed between the initial and final time contacts 16. The extra blank contact 17 is illustrated merely to indicate that the present invention may be constructed to anticipate further expansion of the sequencing control.

The illustrated relay switch assembly 6 further includes a stepping coil 20 adapted to rotate the contact arm 15 in a sequential manner from one contact to the next in response to the energization and de-energization of the coil 20. In this manner, the contact arm 15 moves, in a clockwise direction in FIG. 1, and scans the time contacts 16, the one or more blank contacts 17 to the reset contact 18. A reset coil 21 is interconnected in the circuit through the contact arm 15 to the control power supply 10 for resetting of the contact arm to the home contact 19, as hereinafter described.

The operation of the sequencing switch 6 is controlled in a timed manner by the input unit 8 which is diagrammatically shown as a clock driven assembly having a set of input contacts 22 periodically open and close by a clock driven cam 23. The drive 24 for the cam is shown in block diagram for simplicity and clarity of explanation. In a wake-up alarm system, the cam 23 may be constructed to rotate 360° every 15 minutes and include an enlarged cam portion for holding of the contacts 22 closed for a selected 5 minutes at the initiation of each 15 minute period. This will then insert a 5 minute operating time at each 15 minute interval. To limit the operation of the system to a given time period, a manual on-off switch 25 may be connected in circuit with the control or input contacts 22.

The contacts 22 are connected between a control power line 26, connected to the one side of the direct current low voltage power supply 10, and one side of an input relay winding 27 of an input control relay 28. The opposite side of winding 27 is interconnected to a return or common line 29 to the DC power supply 10. The relay 28 is shown as a double pole, double throw relay having a first common contact arm 30 alternately engaging an operating power contact 31 and a bypass contact 32. A second contact arm 33 is ganged to the first contact arm 30 and correspondingly engages a stepping power contact 34 and a step contact 35.

The double pole, double throw relay 28 is shown in an initially actuated position at which time the contact 22 is closed and the relay 28 energized. In this condition, the contact arm 30 is connected via the lead 36 to the common contact arm 15 of the sequence switch 16. The contact arm 30 engages the contact 31 which is connected via the lead 37 to the one side of the operating power supply 9. The opposite side of the power supply 9 is connected to a common lead 38 which is interconnected to the common cable lead 14 to establish a return circuit path to the power supply through the sequence switch 6 and any related remote station selector switches 5 as subsequently described. In the stand-by or starting position shown, the arm 15 engages the home contact 19 which is a dead contact. Consequently, the circuit is broken at the sequencing switch 6 during the first closing of the contacts 22.

During this period, however, the double pole, double throw relay 28 has also repositioned the contact arm 33 from contact 35 into engagement with contact 34. A resistor 39 interconnects the contact 34 to the common power lead 38. The arm 33 is connected to one side of a capacitor 40, the opposite side of which is connected directly to the return lead 29 of the control power supply 10 or source 10. Therefore, during the period that the relay 28 is energized to apply power to the contact arm 15, the capacitor 40 is charged through the resistor 39 to the polarity and level of the direct current power supply 10, the positive side of which is shown connected directly to the common lead 38. The charging circuit for the capacitor 40 may therefore be traced from the positive side of the power supply 10 via lead 26, lead 38, resistor 39, contact 34, contact arm 33, capacitor 40 and return lead 29 to the power supply 10. The resistor 39 controls the charging current level and thereby protects the relay contacts and the direct current power source. At the end of the 5 minute or other selected timing period, the relay 28 is de-energized as a result of the opening of contacts 22. The contact arms 33 and 30 revert to the phantom line position.

In the phantom line position of the relay 28, the contact arm 33 moves into engagement with the contact 35 to energize a step relay 41. The relay 41 is shown as a single pole, double throw relay having a contact arm 42 interconnected directly to the common lead 38 and selectively engaging a first contact 43 which is connected to the contact 32 of the relay 28. This provides a direct connection and grounding of the common contact arm 15 of the sequencing switch in the phantom line position. The movement of contact arm 33 into engagement with the contact 35 connects the capacitor 40 directly across the winding 44 of the relay 41. When the winding 44 is energized, it moves the contact arm 42 from engagement with the contact 43 and into engagement with a stepping contact 45 which is connected to one side of the stepping coil 20 of the sequencing switch 6. The opposite side of the coil 20 is connected to the line 29. Consequently, during the period capacitor 40 discharges through the relay winding 44 as a result of the closing of the contact 35, the coil 20 is energized from the positive side of the power supply 10 via the lead 26, lead 38, arm 42 of relay 41, contact 45, coil 20 and back to the power supply 10 via the lead 29.

The coil 20 is interconnected in a well-known manner through a mechanical linkage, not shown, to move the wiper or common contact arm 15 from the home terminal or contact 19 to the first signal terminal or contact 16. Thus, this permits the application of power via the first signal line 13 of cable 3 to all of the corresponding first terminals 12, of the selector switches 5 at the remote stations. During the stepping period, however, as just described, power is not actually applied as the contact arm 30 of the relay 28 is engaged with the contact 32. When the capacitor 40 is discharged to a selected level, it can no longer maintain the relay 41 energized at which time the contact arm 42 reverts to stand-by full line position shown engaging the contact 43 and thereby de-energizing coil 20. The mechanical linkage then resets without effecting the position of the arm or wiper 15 in anticipation of a subsequent step.

In this position, the lead 38 of the power supply 9 is connected to both the common cable lead 14 of the cable 3 and the first signal lead 13 of the cable 3 via the contact 15 to establish a short or by-pass circuit across the remote station load to prevent possible false operation, as follows: from lead 38, the circuit may be traced via the contact arm 42 and contact 43 of relay 41 to contact 32 of relay 28, contact arm 30, lead 36, common arm 15 and the first engaged contact 16 of the sequencing switch 6, the associated signal line 13 to the first load selector remote room station 2 which is shown with the contact arm 11 in engagement with the related first contact 12. The circuit continues via the contact 12 and arm 11 through the load 4 to the common return line 14 of the cable 3 which is connected directly back to the common lead 38. Thus, both sides of the output or load device 4 are connected to the corresponding lead 38 and consequently no power can be transmitted over the cable to the output device. This will prevent false operation of the devices.

At the beginning of the next 15 minute period, the cam 23 will again engage and hold contacts 22 closed for the desired 5 minute period. This, in turn, results in the re-energization of the relay 28 and the movement of the double pole, double throw relay to the full line position. As previously noted, this applies power from the operating power supply 9 via the lead 37 to the contact arm 15 of the sequencing switch 6. The switch 6 is now in position with arm 15 engaging the first signal contact 16 and thus power is applied via the line 13 to the first contact 12 of the remote room stations 2 with the power returning via the switch 5 and the load 4, the common return lead 14 of cable 3 to the common lead 38 thereby applying the voltage of the power supply 9 across the output load 4. This energizes the related output device 4 which may be any suitable means to provide an audible or other signal to the room occupant. This signal will be maintained for the 5 minute period or until such time as the occupant resets the selector switch 5 from the then set position.

A corresponding signal is transferred to every one of the remote room stations 2. At the end of the 5 minute period, the contact 22 again reopens. The double pole, double throw relay 28 resets to the phantom line position. The capacitor 40 is then discharged through the relay 41 to apply power to the step coil 20. This results in the sequential movement of the contact arm to the next time contact 16. At the end of the timing period, relay 41 resets and again directly provides a short circuit across the sequencing switch 6 and the loads 4 interconnected to the second contact 16 via the cable 3 to prevent false operation in the same manner previously described.

Thus, the entire sequential operation repeats each time the time contacts 22 are closed to sequentially provide a transmitting signal for the corresponding time period to the remote stations, to charge the capacitor 40 for the same period and at the end of the timing period to advance the sequencing switch 6 to the next position and to establish a by-pass across the load circuit then permitted to maintain the proper operation. The sequential timed operation of the system continues until the contact arm 15 moves into engagement with the reset contact 18. When the relay 41 releases, power is supplied to the reset coil from the direct current control power supply 10 as follows, starting with the positive side of the supply 10, via the leads 26 and 38 to the contact arm 42 of the relay 41, the contact 43 of such relay to the contact 32 of the relay 28, the engaged contact arm 30, lead 36, contact arm 15 and now engaged contact 18 of switch 6 directly to one side of the coil 21 and through the coil 21 directly to the return line 29 and the opposite side of the direct current power supply 10. The energization of the coil 21 operates to move the contact arm 15 to the home contact 19. In an actual construction, the contact arm 15 moves in the opposite or counterclockwise direction momentarily engaging all of the contacts 16 of the switch assembly 6. As previously noted, however, the contact arm 15 at this time is interconnected into the circuit through the common lead 38 and thus the same potential is applied between each of the contacts 16 and the common return lead 14 of the cable 3. This will prevent an erroneous or momentary energization of any load device 4.

As previously noted, the present invention has been found to provide a relatively inexpensive and readily maintained remote control for a great number of remote stations which may be constructed for further expansion. The output device or load may be any responsive means which will provide the function desired, for example, providing either visual, audible or a combination signal.

In FIG. 2, a remote station panel is diagrammatically illustrated including a speaker housing or support 46 with a plurality of controls disposed immediately therebelow. For example, the hour selector control for the selector switch 5 may be a rotating knob 47 mounted with a properly labeled time indicator 48. Additionally, the assembly may include a remote radio system having a program selector 49 selectively interconnecting a speaker 50 into a remote radio, not shown. Other additional signaling lights and the like may also be incorporated into the unit. The output device 4 of FIG. 1 may be a relay or other switch which will interconnect the program selector 49 and the speaker 50 of the unit 46 at the desired selected time such that a desired radio program forms the audible signaling means. The sleeping person will thus be awakened by music, news or other program being transmitted by this selected station and at the selected time. The signal will automatically turn off after a predetermined length of time unless the person manually resets the selector switch.

The operating time can, of course, be readily adjusted by the input drive. For example, the speed of the cam rotation can be varied to vary the time of signal transmission. Further, the cam can be replaced to vary the on-off time of the input and thereby varying the on time of the signal transmitted. The present invention provides a system which is relatively readily installed and maintained and which may be constructed to readily anticipate expansion to a number of additional remote stations.

I claim:

1. A periodic timed switching apparatus, comprising a sequencing means having a plurality of output means and an input means to sequentially activate the output means, power supply means, first switch means to selectively connect said output means to said power supply means, second switch means selectively connecting said input means to said power supply means, said second switch means having actuating means connected in circuit through said first switch means and said actuating means being responsive to the sequential energization and de-energization of said first switch means to operate said input means to activate a selected output means, and timing means connected to periodically actuate said first switch means, said sequencing means including a stepping switch having a common contact means sequentially engaging a plurality of output contacts in response to the sequential energization of the input means, said stepping switch including a reference potential means connected to the power supply means, an energy storage means, said first switch means selectively connecting said common contact means and said energy storage means to said power supply means and to said second switch means to connect said input means to said energy storage means and said common contact means to said reference potential means.

2. A periodic timed switching apparatus, comprising sequencing means having a plurality of output means and an input means to sequentially activate the output means, power supply means, first switch means to selectively connect said output means to said power supply means, second switch means selectively connecting said input means to said power supply means, said second switch means having actuating means connected in circuit through said first switch means and said actuating means being responsive to the sequential energization and de-energization of said first switch means to operate said input means to activate a selected output means, and timing means connected to periodically actuate said first switch means, a plurality of remotely located load means, a cable means having individual conductor means connected to the output means and extending to said load means, a selector switch means for each load means, each selector switch means being connected to the load means and the individual conductor means of the cable to selectively connect the load means to the cable.

3. The switching apparatus of claim 2, wherein each of said remotely located stations includes an audible signal means, said cable means having individual conductor means each connected to one of the plurality of output means and extending to said stations, said selector switch means at each station connected to the signal means and to the individual conductor means of the cable to selectively connect the signal means to the conductor means and thereby restrict operation of the signal means to a selected output means.

4. The switching apparatus of claim 2, wherein said cable means includes individual conductors each connected to one of the plurality of output means and extending to said loads and having a common return conductor, said selector switch means at each load having a common contact connected in series with the load means to the common return conductor and a plurality of selectively engageable contacts each of which is connected to one of the individual conductors of the cable to selectively connect the load means to the cable.

5. A periodic timed switching apparatus, comprising a sequencing means having a plurality of output means and an input means to sequentially activate the output means, power supply means, first switch means to selectively connect said output means to said power supply means, second switch means selectively connecting said input means to said power supply means, said second switch means having actuating means connected in circuit through said first switch means and said actuating means being responsive to the sequential energization and de-energization of said first switch means to operate said input means to activate a selected output means, and timing means connected to periodically actuate said first switch means, said power supply means includes a first power source connection mean and a second direct current power source connection means, said switch means connecting said first power source connection means to said output means and said second direct current power source connection means to the input means of the sequencing means and to an operating means of said first switch means.

6. The switching apparatus of claim 5, wherein said timing means includes switch means connected between the operating means and the power source connection means.

7. A periodic timed switching apparatus, comprising a sequencing means having a plurality of output means and an input means to sequentially activate the output means, power supply means, first switch means to selectively connect said output means to said power supply means, second switch means selectively connecting said input means to said power supply means, said second switch means having actuating means connected in circuit through said first switch means and said actuating means being responsive to the sequential energization and de-energization of said first switch means to operate said input means to activate a selected output means, and timing means connected to periodically actuate said first switch means, the sequencing means being a stepping switch means having an operating means for positioning a movable contact member sequentially engaging a plurality of contacts and a reset means to return the contact member to a start position, a signal cable having a lead connected to each of said contacts and having a common return lead connected to the power supply means, said first switch means including a pair of common output contact means and an operating means for operatively connecting said contact means to separate contacts means, a first of said common output contact means being connected to said movable contact member, a capacitor connected to the second of said common output contact means, said separate contact means being connected to said power supply means for connecting said common output contact means and said capacitor to the power supply means, said second switch means including an operating means connected between said capacitor and a separate contact means associated with the second common output contact means and having a common output means connected to the common return lead and a pair of separate contact means one of which is connected to the operating means of the stepping switch means and the other of which is connected to a contact means of the first switch means to connect the common output contact means to the common return lead.

8. A periodic timed switching apparatus, comprising sequencing means having a plurality of output means and an input means to sequentially activate the output means, power supply means, first switch means to selectively connect said output means to said power supply means, second switch means selectively connecting said input means to said power supply means, said second switch means having actuating means connected in circuit through said first switch means and said actuating means being responsive to the sequential energization and de-energization of said first switch mean to operate said input means to activate a selected output means, and timing means connected to periodically actuate said first switch means, the sequencing means being a stepping relay having an operating winding and a movable contact sequentially engaging a plurality of contacts, a signal cable having a lead connected to each of said contacts and having a common return lead, said first switch means including a double pole, double throw switch having an operating winding, a capacitor, said second switch means being a single pole, double throw switch and an operating winding, said double pole, double throw switch having a first position connecting said contact member to one side of said power supply and connecting said capacitor to said power supply means and a second position connecting said contact member to a common return lead contact and said capacitor across said operating winding of said second switch means, said second switch means having a first position connecting the common return lead to said common return lead contact and a second position connecting the common return lead to the operating winding of the stepping relay.

9. The switching apparatus of claim 8, wherein said power supply means includes a first power source connection means and a second direct current power source connection means, said switch means being connected to connect said first power source connection means to said movable contact member and said second direct current power source connection means to actuate said switch means.

* * * * *